United States Patent Office 2,802,006
Patented Aug. 6, 1957

2,802,006

ESTERS OF THE YOHIMBE ALKALOIDS

Charles F. Huebner, Chatham, and Robert A. Lucas, Mendham, N. J., assignors to Ciba Pharmaceutical Products, Inc., Summit, N. J., a corporation of New Jersey No Drawing. Application June 7, 1954,
Serial No. 435,060

7 Claims. (Cl. 260—286)

The present invention relates to the preparation of novel esters of the yohimbe alkaloids, yohimbine and corynanthine, and more particularly novel aromatic esters of yohimbine and corynanthine, and salts thereof, e. g., the O-benzoyl esters of yohimbine and corynanthine, wherein the benzoyl group is unsubstituted or substituted, for instance by lower alkoxy groups, as methoxy, ethoxy and the like.

The novel yohimbine and corynanthine esters are useful as adrenolytic and hypotensive agents, and in this regard there is especially mentioned O-benzoylyohimbine, O-lower alkoxybenzoylyohimbine, e. g., O-anisoylyohimbine, O-veratroylyohimbine, and more particularly O-3,4,5-trimethoxybenzoylyohimbine and O-3,4,5-trimethoxybenzoylcorynanthine. These compounds exhibit both activities, but unlike yohimbine are substantially free from side effects, such as central stimulation and convulsive action exhibited by yohimbine and the known yohimbine monoacetate and yohimbine diacetate.

In general, the novel aromatic esters of yohimbine and corynanthine can be prepared by reacting the alkaloid with an aromatic acid or an esterifying derivative thereof such as an aromatic acyl halide. Where the aromatic acyl halide is employed, it is advantageous to carry out the reaction in the presence of an acid acceptor, e. g., an organic base, such as, pyridine, or an inorganic basic compound, e. g., sodium carbonate, calcium carbonate, and the like. It will be understood, that any other usual methods can be employed for producing the novel esters comprising the invention.

The novel esters can be obtained in the form of the free base or as salts, for example, of organic or inorganic acids, such as the acetate, tartrate, hydrochloride, sulfate, nitrate, and other non-toxic or therapeutically useful salts.

The following examples will serve to illustrate the invention, parts by weight bearing the same relationship to parts by volume as the gram to the millimeter.

*Example 1*

A solution of two parts by weight of yohimbine and four parts by weight of veratroyl chloride in 20 parts by volume of pyridine is allowed to stand for 16 hours at room temperature. Most of the pyridine is then removed by distillation in vacuo, and 100 parts by weight of ice water are added to the mixture. 100 parts by volume of ethyl acetate are added, and with shaking a 25 percent solution of sodium hydroxide solution is carefully added portionwise until the reaction mixture becomes basic. The solution is extracted a second time with ethyl acetate. The ethyl acetate solution is shaken with 5 percent aqueous hydrochloric acid whereupon O-veratroylyohimbine hydrochloride precipitates. This is filtered and the hydrochloride is triturated with 5 percent aqueous sodium hydroxide in the presence of ethyl acetate. The ethyl acetate layer is washed with water, dried over sodium sulfate and concentrated whereupon O-veratroylyohimbine crystallizes. Upon recrystallization from ethyl acetate the compound melts at 227–230° C.

*Example 2*

A solution of 2 parts by weight of yohimbine and 1.57 parts by weight of 3,4,5-trimethoxybenzoyl chloride in 20 parts by volume of anhydrous pyridine is allowed to stand at room temperature. The crystalline precipitate which forms, with completion in about 2½ hours, is filtered off and washed with benzene. The precipitate is triturated with 5 percent aqueous caustic sodium hydroxide in the presence of ethyl acetate till all of the solid has dissolved. The ethyl acetate solution is dried and concentrated to yield an oil. This is taken up in hot ethanol and upon cooling crystals of O-3,4,5-trimethoxybenzoyl-yohimbine are obtained. On recrystallization from ethanol the compound melts at 246–250° C. The hydrochloride can be obtained by treating with hydrochloric acid.

*Example 3*

A solution of one part by weight of yohimbine and one part by volume of benzoyl chloride in 15 parts by volume of anhydrous pyridine is allowed to stand for 16 hours at room temperature. Two-thirds of the pyridine is removed in vacuo, then ice water and 50 parts by volume of ethyl acetate are added. The mixture is treated while shaking with 5 percent aqueous potassium hydroxide until it becomes alkaline. The ethyl acetate layer is shaken with 5 percent aqueous hydrochloric acid whereupon O-benzoylyohimbine hydrochloride separates. This is filtered and converted into the free base by triturating with 5 percent aqueous sodium hydroxide in the presence of ethyl acetate. The ethyl acetate layer is washed with water, dried and distilled in vacuo to remove solvent. The residue is recrystallized from an ethanol-water mixture yielding O-benzoylyohimbine, M. P. 166–167° C.

*Example 4*

A solution of 2 parts by weight of yohimbine and 1.1 parts by volume of anisoyl chloride in 15 parts by volume of anhydrous pyridine is allowed to stand at room temperature for 16 hours. The reaction mixture is worked up in the same manner as described in Example 3. The insoluble O-anisoylyohimbine hydrochloride is converted into the free base also in the same manner as described in Example 3, and the base is recrystallized from acetone water. The O-anisoylyohimbine melts at 247–250° C.

*Example 5*

A solution of 5 parts by weight of corynanthine M. P. 221–5° C. and 15 parts by weight of 3,4,5-trimethoxybenzoyl chloride in 150 parts by volume of pyridine is allowed to stand at room temperature for five days. To the reaction mixture is then added 200 parts by weight of ice and a small amount of 3,4,5-trimethoxybenzoylanhydride formed as a side product in the reaction is filtered off. The solution is evaporated to dryness in vacuo and the residue dissolved in 500 parts by volume of chloroform. The chloroform solution is washed in succession with an excess of 2 percent aqueous hydrochloric acid, 2 percent aqueous potassium hydroxide, 2 percent aqueous hydrochloric acid and water. The chloroform is evaporated to dryness in vacuo and the residue triturated with 150 parts by volume of benzene. The benzene insoluble portion is recrystallized from acetone to yield purified O-3,4,5-trimethoxybenzoylcorynanthine hydrochloride, M. P. 235–7° C. The free base can be obtained by treating the hydrochloride with aqueous sodium hydroxide in the manner disclosed in Example 1.

By employing veratroyl chloride, benzoyl chloride, anisoyl chloride instead of 3,4,5-trimethoxybenzoyl chloride, and proceeding in the same manner, O-veratroyl-, O-benzoyl- and O-anisoylcorynanthine, respectively can be obtained.

Other aromatic esters than those illustrated by the above examples can be prepared as well as araliphatic esters of yohimbine. Thus, proceeding in the same way but employing instead cinnamoyl chloride, 3,4,5-trimethoxycinnamoyl chloride, 3,4-dichlorobenzoyl chloride, phenylacetyl chloride, 3,4,5-triethoxybenzoyl chloride, piperonylic acid chloride, 4-chlorobenzoyl chloride, and p-nitrobenzoyl chloride, the corresponding yohimbine and corynanthine esters of the aforementioned acids may be prepared.

Instead of employing the acyl chlorides, the acyl bromides can also be used.

The novel compounds can be administered in any suitable unit dosage form, either parenterally or orally.

What is claimed is:

1. A member selected from the group consisting of yohimbyl and corynanthyl esters and therapeutically useful acid addition salts thereof wherein the esterifying acid group is a member selected from the group consisting of O-veratroyl, O-3,4,5-tri-lower alkoxy-benzoyl, O-benzoyl, O-lower alkoxy benzoyl, O-cinnamoyl, O-3,4,5-tri-lower alkoxy-cinnamoyl, O-3,4-dichlorobenzoyl, O-phenyl-acetyl, O-piperonyl, O-4-chlorobenzoyl and O-p-nitrobenzoyl radicals.
2. O-benzoylyohimbine.
3. O-lower alkoxybenzoylyohimbine.
4. O-anisoylyohimbine.
5. O-3,4,5-trimethoxybenzoylyohimbine.
6. O-3,4,5-trimethoxycinnamoylyohimbine.
7. O-3,4,5-trimethoxybenzoylcorynanthine.

References Cited in the file of this patent

Dorfman et al., Helv. Chim. Acta., vol. 37, pp. 59–75 (1954).